United States Patent [19]
Mehnert

[11] 3,749,541
[45] July 31, 1973

[54] APPARATUS FOR THE PRODUCTION OF BLOW MOLDED PLASTIC ARTICLES

[76] Inventor: Johannes Mehnert, Ernststrassee 11, St. Augustin-Menden, Germany

[22] Filed: July 27, 1971

[21] Appl. No.: 166,356

[52] U.S. Cl.......... 425/326, 425/450, 425/DIG. 206
[51] Int. Cl............................................. B29d 23/03
[58] Field of Search..................... 425/326 B, 387 B, 425/450, 451

[56] References Cited
UNITED STATES PATENTS

| | | | |
|---|---|---|---|
| 2,988,776 | 6/1961 | Schaich | 425/326 X |
| 3,325,860 | 6/1967 | Hansen | 425/326 X |
| 3,344,471 | 10/1967 | Martelli | 425/326 X |
| 3,465,073 | 9/1969 | Fogelberg et al. | 425/326 X |
| 3,496,600 | 2/1970 | Heston | 425/326 X |
| 3,555,598 | 1/1971 | Mehnert | 425/326 X |
| 3,608,135 | 9/1971 | Schurman | 425/326 |

FOREIGN PATENTS OR APPLICATIONS

| | | | |
|---|---|---|---|
| 420,582 | 3/1967 | Switzerland | 425/326 |

Primary Examiner—Robert D. Baldwin
Assistant Examiner—Michael O. Sutton
Attorney—Michael S. Striker

[57] ABSTRACT

The transporting mechanism for the mold sections in a blow molding apparatus has horizontal tie rods which are rigidly connected with one mold section and reciprocably guide the other mold section. The tie rods are parallel to the barrel of the plasticizer which is mounted at a level above the transporting mechanism. A frame of the transporting mechanism guides a housing which reciprocably supports the tie rods and is confined to reciprocatory movements in parallelism with the tie rods. A double-acting hydraulic cylinder is connected with the other mold section and with the frame to move the other mold section relative to the tie rods as well as to move both mold sections from registry with the extruding head of the plasticizer to a blowing station or vice versa. A system of racks and pinions can move the tie rods and the housing relative to the other mold section in response to actuation of the double-acting cylinder.

21 Claims, 4 Drawing Figures

Inventor:
JOHANNES MEHNERT

BY

ATTORNEY

APPARATUS FOR THE PRODUCTION OF BLOW MOLDED PLASTIC ARTICLES

BACKGROUND OF THE INVENTION

The present invention relates to apparatus for the production of plastic articles in general, and more particularly to improvements in plants of the type wherein the sections of a blow mold receive one or more synthetic thermoplastic blanks or parisons at a first station and are thereupon shifted to a second station at which the parison or parisons are expanded to form bottles or other types of hollow plastic articles.

Presently known apparatus wherein the sections of a blow mold are movable between a parison-receiving and a blowing station are designed in such a way that the direction of simultaneous movement of closed mold sections with confined parisons is different from the direction of movement of mold sections with reference to each other. This is considered necessary in order to move the mold sections out of the path of freshly formed parisons. A drawback of such apparatus is that the means for guiding, moving and otherwise manipulating the mold sections is highly complex, expensive and prone to malfunction, and that such means comprises a large number of parts. This is primarily attributable to the fact that the mold sections must be moved in several directions, namely in a first direction or directions during movement with reference to each other between open and closed positions, and in one or more second directions during movement with a freshly introduced parison or with a freshly formed blow-molded article. Moreover, such apparatus occupy much room and they cannot be placed close to one or more additional apparatus, for example, in a mass-producing plant which employs entire batteries of discrete apparatus. Still further, such apparatus cannot be provided with a stable closing mechanism because, while moving toward the receiving station, the mold sections must provide a path or space for the freshly formed parison. The intervals which are required for the completion of a blow molding operation are long, again mainly due to the fact that the direction of travel of mold sections with the parison is different from (as a rule normal to) the direction of movement of mold sections with reference to each other. This will be readily understood since the mold sections must be accelerated, decelerated and brought to a full stop first during movement with reference to each other and thereupon during simultaneous movement toward the blowing station. The same holds true for the return movement of mold sections from the blowing station to their open positions. The full cooling capacity of mold sections is not utilized during such long intervals between successive blow molding operations.

Losses in time are particularly felt when the apparatus of the above-outlined character are used for the production of relatively lightweight and small hollow plastic articles. Such articles can be cooled within very short intervals of time, i.e., within intervals which are much shorter than the intervals which elapse between the completion of a blowing operation and the removal of finished articles from the mold cavity. Thus, the apparatus of the just described type operate at less than a desirable optimum capacity, namely, their output is less than the output which is determined primarily by the length of intervals which are required for the cooling of freshly blown articles prior to removal from the mold cavity. Since such apparatus comprise a large number of rather bulky movable parts, their energy requirements are considerable which also contributes to their operating cost. Attempts to reduce the bulk of such apparatus and hence the space and energy requirements by reducing the size of mold sections and their supports have met with little success because, as the dimensions of the mold sections are reduced, the length of working strokes of the drive means for the mold sections must be increased to thus further prolong the intervals between successive blow molding operations.

It was further proposed to construct a blow molding apparatus in such a way that the direction of movement of mold sections with reference to each other coincides with the direction of simultaneous movement of mold sections toward and from the blowing station. Such modified apparatus employ two discrete and independently operated closing units which are mounted on a common carriage and are shiftable as a unit. Each closing unit is associated with an auxiliary carriage for a blowing unit. The purpose of simultaneous movement of mold sections from the parison-receiving station is to enable the second closing unit to move below the path of parisons. The output of such apparatus is higher than the output of the first discussed conventional apparatus; however, this is achieved at a very high cost because the modified apparatus employ a complicated driving system and an equally complicated control system which programs the movements of various units and their parts. Another drawback of such modified apparatus is that the mold sections must be moved at right angles to the longitudinal direction of the barrel in the plasticizing unit which is mounted in horizontal position. This contributes to the overall width of the apparatus, which is another reason why such apparatus failed to gain widespread acceptance in the blow molding art.

SUMMARY OF THE INVENTION

An object of the invention is to provide in an apparatus for the production of hollow plastic articles by the blow mold a novel and improved mechanism which serves to the sections of one or more blow molds between open and closed positions as well as between a parison-receiving and a blowing station and is simpler, more compact and less prone to malfunction than the transporting mechanisms in presently known blow molding apparatus.

Another object of the invention is to provide a blow molding apparatus wherein the mold sections are movable together between parison-receiving and blowing stations with a novel transporting mechanism which serves to transport the mold sections in such a way that the intervals between successive blow molding operations are shorter than in presently known apparatus.

A further object of the invention is to provide an apparatus of the above-outlined character wherein the transporting mechanism for the sections of the blow mold or molds occupies less floor space than in presently known apparatus and which can be placed close to one or more similar apparatus without affecting the accessibility of the transporting mechanism, mold sections, ejectors, extruder head, the plasticizing unit and/or other component parts of the apparatus.

An additional object of the invention is to provide novel and improved drive means for use in a transporting mechanism of the above-outlined character.

Still another object of the invention is to provide the transporting mechanism with novel and improved guide means for the mold sections.

The invention is embodied in an apparatus for the production of hollow plastic articles by the blow molding method. The apparatus comprises an elongated plasticizing and extruding unit having extruder means for discharging blanks of plasticized material in a predetermined plane which is preferably normal to the longitudinal direction of the unit, at least one blow mold having first and second mold sections, and transporting means for moving the mold sections together with and relative to each other in the longitudinal direction of the unit between open positions in which the mold sections are located at the opposite sides of the predetermined plane so that the extruder means can discharge a blank into the space between the mold sections, then to closed positions in which the mold sections meet in the predetermined plane to confine the blank which was discharged into the space between the open mold sections, and thereupon simultaneously to transport the confined blank into a second predetermined plane at the blowing station. The transporting means is preferably arranged to move the mold sections in a substantially horizontal plane and preferably comprises elongated guide means which is parallel to the barrel of the plasticizing and extruding unit and is rigid with one of the mold sections. The other mold section is movable along the guide means toward and away from the one mold section and the transporting means further comprises first drive means for moving the other mold section with reference to the one mold section as well as for moving the guide means together with the one mold section.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
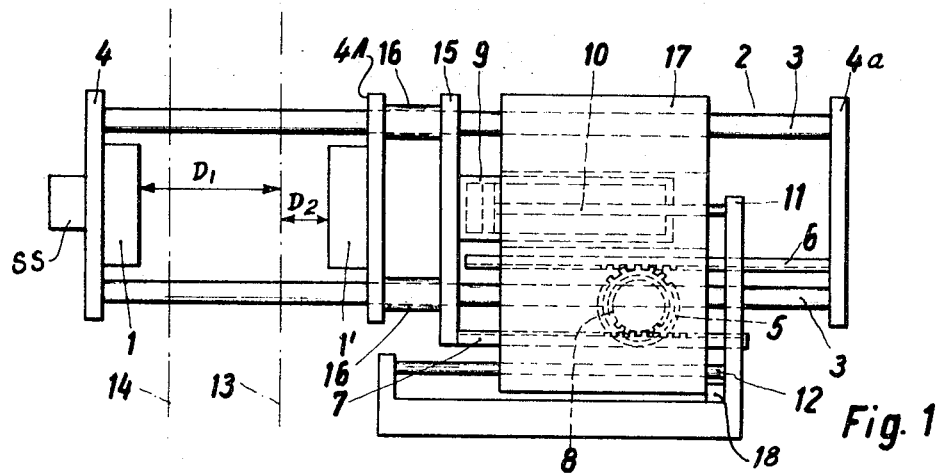
FIG. 1 is a diagrammatic side elevational view of a transporting mechanism for the sections of a blow mold which embodies the invention, with the mold sections shown in open positions.
Figure 2:
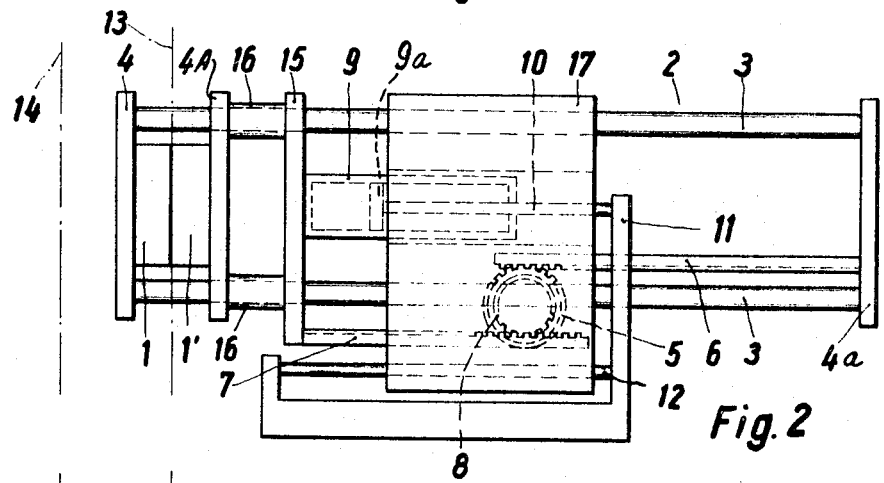
FIG. 2 is a similar side elevational view of the transporting mechanism but showing the mold sections in closed positions.
Figure 3:
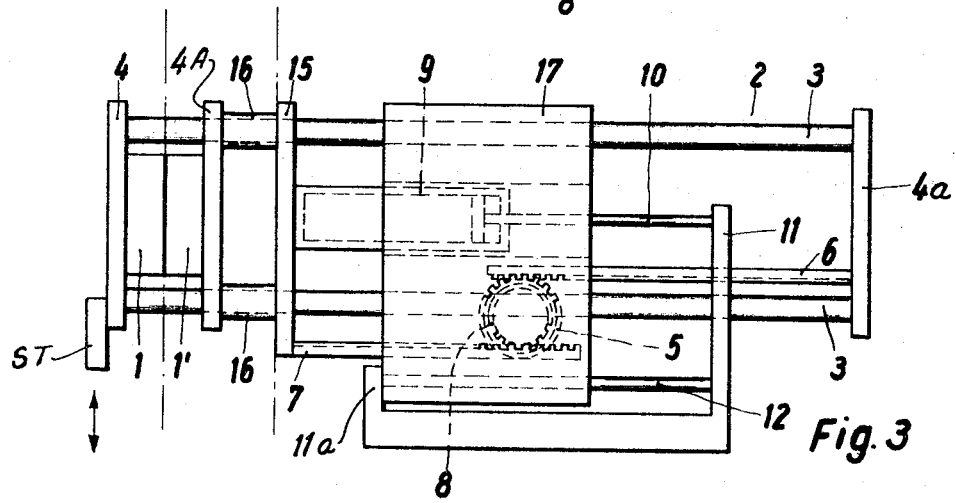
FIG. 3 is a similar side elevational view of the transporting mechanism but showing the closed mold sections at the blowing station.

FIGS. 1–3 illustrate a transporting mechanism having a stationary frame or base 11 provided with horizontal guide means including several parallel tie rods 12 for a housing 17. The latter is movable along the tie rods 12 between the end position of FIG. 1 and the end position of FIG. 3. The housing 17 serves as a carriage for an elongated second guide means 2 having four horizontal tie rods 3 the ends of which are connected to each other by means of crossheads or platens 4 and 4a. The crosshead 4 serves as a supporting platen for one (1) of two mold sections 1 and 1'. The other mold section 1' is secured to a platen 4A which is reciprocable along the tie rods 3 of the guide means 2 and is connected with an auxiliary platen 15 by means of several coupling devices here shown as distancing sleeves 16. The housing 17 and the guide means 2 are movable with reference to the frame 11, the guide means 2 is movable with reference to the housing 17, and the mold section 1' is movable relative to the guide means 2.

The mold sections 1 and 1' are provided with one or more cutouts or recesses which together form one or more mold cavities for parisons when the mold is closed (see FIGS. 2 and 3). The tie rods 3 of the guide means 2 are disposed at the corners of a rectangle to form with the crossheads or platens 4, 4a a stiff guiding structure for the platen 4A of the mold section 1'.

The drive means for moving the movable parts of the apparatus comprises a reversible fluid-operated drive including a double-acting hydraulic cylinder 9 which is secured to the auxiliary platen 15 and receives a piston 9a connected to a piston rod 10 which is fixed to the stationary frame 11. Thus, depending upon whether the right-hand or the left-hand chamber of the cylinder 9 receives a pressurized hydraulic fluid, the cylinder 9 is moved in a direction to the right or to the left, as viewed in FIGS. 1–3, to thereby entrain the mold section 1'. The cylinder 9 can further cause the mold section 1 to move toward or away from the mold section 1' through the intermediary of a mechanical drive including an elongated straight toothed rack 7 which is attached to the auxiliary platen 15 and meshes with a relatively small gear 8 mounted in the housing 17. The gear 8 is coaxially secured to a larger gear 5 meshing with a rack 6 which is secured to the crosshead 4a. Those portions of the racks 6, 7 which respectively mesh with the gears 5, 8 are located diametrically opposite each other; therefore, when the rack 7 rotates the associated gear 8 while moving in a direction to the right, the gear 5 causes the rack 6 to move in a direction to the left, and vice versa. The rack 7 rotates the gears 8, 5 whenever the cylinder 9 causes the rack 7 to move lengthwise. The drive including the parts 5–8 constitutes a step-up transmission which can move the rack 6 at a speed exceeding the speed of the rack 7 because the rack 6 is driven by the larger-diameter gear 5.

Accelerated movements of the rack 6 and hence of the platen 1 with reference to the frame 11 are desirable because, in order to assume the closed position of FIG. 2, the mold section 1 must cover a distance D1 which is several times the distance D2 covered by the mold section 1'. The line 13 indicates the plane in which the faces of the mold sections 1, 1' meet when they assume the closed positions of FIG. 2 to thereby confine a freshly introduced parison and to be ready for transport to the blowing positions shown in FIG. 3. In such blowing positions of the mold sections 1 and 1', their faces abut each other in the plane 14. Thus, the mold sections 1 and 1' must travel in opposite directions and at different speeds to move from the open positions of FIG. 1 to the closed positions of FIG. 2, and the two mold sections thereupon move as a unit from the positions of FIG. 2 to those shown in FIG. 3. Therefore, the drive 5-8 must be rendered ineffective when the sections 1, 1' are to move from the positions of FIG. 2 to the positions of FIG. 3. This is achieved by the provision of arresting means 18 and 11a which are respectively provided to temporarily hold the housing 17 against movement from the right-hand end position of FIG. 1 or 2 to the left-hand end position of FIG. 3 and to hold the housing 17 against movement beyond the left-hand end position of FIG. 3. The distance between the two end positions of the frame 17 equals the distance between the planes 13, 14, i.e., it equals the extent of movement of mold sections 1, 1' between their closed and blowing positions.

Figure 4:
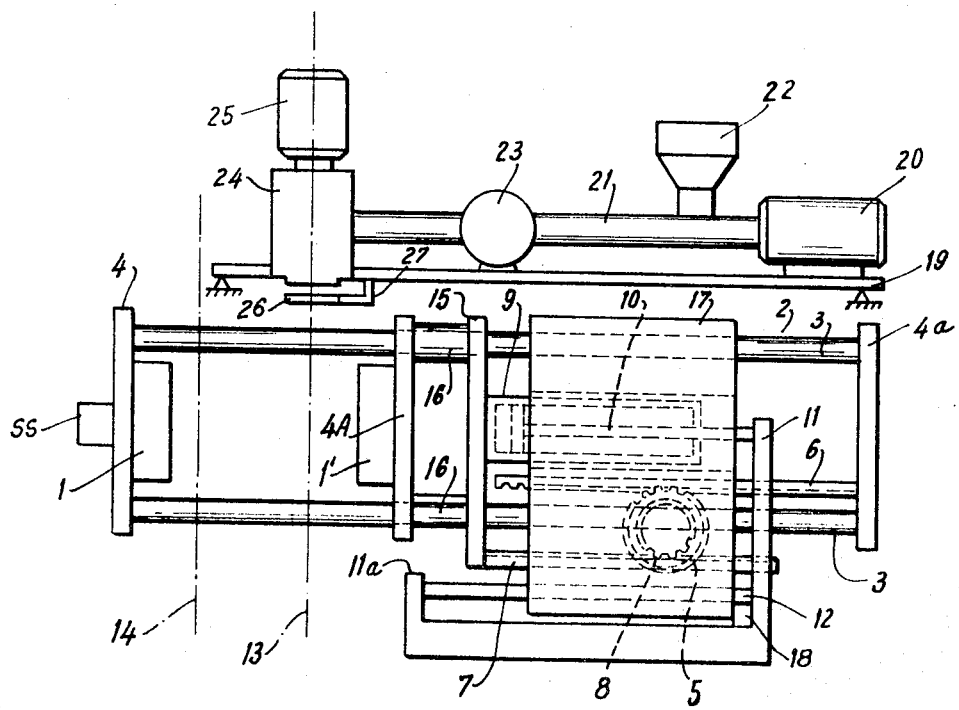
FIG. 4 is a side elevational view of the apparatus showing the transporting mechanism below the plasticizing unit and with the mold sections in open positions.

FIG. 4 illustrates the transporting mechanism with the mold sections 1, 1' moved apart as in FIG. 1, and a combined plasticizing and extruding unit which is mounted at a level above the transporting mechanism and includes a stationary frame or support 19. This frame supports an elongated horizontal cylinder or barrel 21 for a material-conveying and plasticizing screw (not shown). The screw in the barrel 21 is driven by an electric motor 20 and an intermediate portion 23 of the barrel 21 constitutes a magazine for plasticized synthetic plastic material which is admitted (for example, in granular form) by way of a feed hopper 22. The axis of the barrel 21 is parallel to the axes of the tie rods 3 and 12.

The material which is plasticized in the barrel 21 is fed into an extruder head 24 having a rotary part driven by a motor 25 and serving to extrude a parison downwardly in the plane 13, i.e., in the plane where the mold sections 1 and 1' meet when they assume the closed positions shown in FIG. 2. The parison is severed by the mold sections 1, 1' or in another suitable way, not later than when the mold sections assume the positions shown in FIG. 2, and the severed lower end portion of such parison constitutes a blank which is converted into a hollow plastic article subsequent to transport of the mold sections 1 and 1' to the positions shown in FIG. 3. A guide ring 26 is mounted on a bracket 27 which is secured to the frame 19 of the extruding and plasticizing unit; the purpose of the ring 26 is to guide the parison during downward movement from the annular orifice (not specifically shown) at the lower end of the extruding head 24. The head 24 discharges a parison of requisite length in the plane 13 when the mold sections 1 and 1' dwell in the open positions shown in FIGS. 1 and 4.

THE OPERATION

It is assumed that the parts of the transporting mechanism dwell in the starting positions of FIG. 1 or 4 in which the blow mold including the sections 1 and 1' is wide open. The orifice of the head 24 extrudes a parison in the plane 13 so that such parison is located in registry with the recesses of the mold sections 1 and 1'. The arresting device 18 holds the housing 17 in the right-hand end position. In response to admission of a pressurized fluid into the left-hand chamber of the cylinder 9, the cylinder begins to move in a direction to the left and pushes the parts 1', 4A, 16, 15 from the positions shown in FIG. 1 to those shown in FIG. 2. The rack 7 is secured to the auxiliary platen 15; therefore, the rack 7 shares the leftward movement of the cylinder 9 and causes the gear 8 to rotate the gear 5 which in turn causes the rack 6, and hence the entire guide means 2 and mold section 1, to advance in a direction to the right from the position shown in FIG. 1 to that shown in FIG. 2. The mold section 1 advances toward the mold section 1' (i.e., toward the plane 13) at a speed which exceeds the speed of movement of the mold section 1' in the opposite direction because the diameter of the gear 5 exceeds the diameter of the gear 8 and, therefore, the speed of leftward movement of the rack 6 exceeds the speed of rightward movement of the rack 7. The ratio of diameters of the gears 5, 8 of the second drive is selected in such a way that the mold sections 1 and 1' meet in the plane 13 (see FIG. 2).

The arresting device 18 is thereupon disengaged so that, as the left-hand chamber of the cylinder 9 continues to receive a pressurized fluid, the housing 17 shares the left-ward movement of the mold section 1' because the latter pushes the mold section 1. Such simultaneous movement of the mold sections 1, 1' from the positions shown in FIG. 2 to the positions shown in FIG. 3 is terminated by the housing 17 which then abuts against the arresting means 11a which constitutes a portion of the frame 11 and/or by a discrete stop ST which is then located in the path of leftward movement of the platen 4 for the mold section 1 and is movable into and from such path. When the mold sections 1, 1' are arrested by the stop ST, their abutting faces are located in the plane 14. One or more blowing and calibrating mandrels (not shown) are thereupon introduced into the end or ends of parisons in the mold cavity or cavities of the closed mold to carry out the blowing operation in a well-known manner not forming part of the present invention.

During movement of the housing 17 with the auxiliary platen 15 from the position of FIG. 2 to the position of FIG. 3, the drive 5-8 is idle and shares the leftward movement of the mold sections 1 and 1'. Thus, the relative positions of toothed racks 6, 7 remain unchanged and this compels the housing 17 to move with the mold sections because the common shaft for the gears 5 and 8 is journalled in the housing 17 and, since the gears do not rotate but the racks 6, 7 do move in a direction to the left, the housing 17 must share such movement and ulitmately reaches the position of FIG. 3 when the platen 4 abuts against the stop ST.

Upon completion of the blow molding operation, the mold must be opened and its sections 1, 1' should return to the positions of FIG. 1 so as to be ready for reception and transport of one or more fresh parisons. This is achieved by introducing a pressurized fluid into the right-hand chamber of the cylinder 9 so that the cylinder moves in a direction to the right and entrains the parts 1', 16, 4A and 15 in the same direction. The arresting device 11a is assumed to temporarily couple the housing 17 to the frame 11 so that the housing 17 cannot move from the position of FIG. 3. Therefore, the rack 7 (which is affixed to the auxiliary platen 15) rotates the smaller gear 8 which rotates the larger gear 5 so that the latter moves the guide means 2 and hence the platen 4 in a direction to the left so that the mold is opened with a minimal delay. When the mold section 1 reaches the fully open position of FIG. 1 or 4, the platen 4 comes into abutment with a stationary stop SS to prevent further leftward movement of the guide means 2. The arresting device 11a is then disengaged and the cylinder 9 is free to return the housing 17 to the right-hand end position at the time when the mold section 1' reaches the fully open position of FIG. 1. Such return movement of the housing 17 takes place because the rack 6 is arrested in response to movement of the platen 4 into abutment with the stop SS; since the rack 7 moves with the cylinder 9, the gears 5, 8 rotate and cause the housing 17 to move in a direction to the right. The extrusion of one or more parisons can begin while the mold sections 1, 1' move from the positions shown in FIG. 3 to those shown in FIG. 1. Such parisons are thereupon pinched off or otherwise severed from the thermoplastic material which issues from the orifice or orifices of the head 24 and are ready to be transported to the blowing station (plane 14) for conversion into hollow plastic articles, such as bottles, jars or the like.

When the mold is open, there is room for introduction of one or more ejectors, such as forks, vacuum bars, suction pipes or the like, for direct engagement with and for removal of one or more freshly formed hollow plastic articles. Such ejector or ejectors can simultaneously serve as shields or baffles to prevent air currents from swaying the parison or parisons during removal of freshly formed articles. Air currents will normally develop during removal of finished products.

An important advantage of the auxiliary platen 15 is that is is connected with the platen 4A for the mold section 1' by a small number of compact parts (distancing sleeves 16). Therefore, the major part of the rear or outer side of the platen 4A is fully exposed which is important for convenient mounting of the ejector or ejectors and for convenient access to the means which secures the mold section 1' to the platen 4A. The outer side of the platen 4 for the mold section 1 is exposed even more than the outer side of the platen 4A.

An advantage of the improved drive means is that a unidirectional movement of the double-acting cylinder 9 suffices to effect a movement of mold sections 1, 1' to the closed positions of FIG. 2 and thereupon to the blowing positions of FIG. 3. This is in contrast to the mode of operation of aforementioned conventional apparatus wherein the direction of movement of mold sections to closed positions is normally at right angles to the direction of movement of closed mold sections toward registry with one or more blowing mandrels. The unidirectional movement of the cylinder 9 renders it possible to greatly reduce the length of intervals between successive blowing operations and renders it possible to employ a more compact and sturdier transporting mechanism. The number of parts in the transporting mechanism of the present invention is only a small fraction of the number of parts in conventional mechanisms which must move the mold sections in several directions which are inclined with reference to each other. This reduces the initial and maintenance cost of the improved transporting mechanism and renders it possible to employ a simpler, more compact and less expensive programming system. Moreover, the simplicity of the drive means for the mold sections 1, 1' reduces the likelihood of vibration and the transporting mechanism occupies much less floor space than presently known mechanisms. The simultaneous transport of mold sections 1, 1' in closed positions takes place along a relatively short path (the distance between the planes 13 and 14) whose length equals the distance between the parison-admitting and blowing stations. The length of such path is independent of the width or thickness of the mold sections 1, 1' (as considered in the longitudinal direction of the cylinder 9).

Additional important savings in time and material can be achieved if each of the platens 4, 4A supports several discrete mold sections or a mold section with a substantial number of recesses so that the closed mold or molds define a large number of cavities for expansion of parisons into bottles or the like. The recesses of a single mold section or several discrete mold sections on the platens 4 and 4A can be placed side-by-side to form a row. A suitable frame can be placed around the plane between the mold sections to support the calibrating cylinder or cylinders as well as the drive means for pushers or the like.

The width of the apparatus is determined mainly by the width of the mold sections 1, 1' (as considered at right angles to the longitudinal directions of the tie rods 3) and the width of the aforementioned frame which can be placed around the plane between the mold sections. Also, all parts of the apparatus are readily accessible from several sides, for example, from the front side (which is shown in the drawing) and from the rear side.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In an apparatus for the production of hollow plastic articles by the blow molding method, a combination comprising an elongated plasticizing unit having extruder means for discharging blanks of plasticized synthetic plastic material in a predetermined plane which is at least substantially normal to the longitudinal direction of said unit; a blow mold having first and second mold sections; and transporting means for first moving said mold sections towards each other in the longitudinal direction of said unit from an open position in which said sections are located at the opposite sides of and are spaced from said predetermined plane so that said extruder means can discharge a blank into the space between said sections to a closed position in which said sections meet in said plane to confine the blank which was discharged into said space, and for thereupon moving said closed mold sections together with each other to transport the confined blank in said longitudinal direction into a second predetermined plane.

2. A combination as defined in claim 1, wherein said transporting means is arranged to move said sections in a substantially horizontal plane.

3. A combination as defined in claim 1, wherein said transporting means comprises elongated guide means supporting said mold sections, at least one of said mold sections being movable lengthwise of said guide means and said guide means being movable lengthwise with said mold sections.

4. A combination as defined in claim 3, wherein said elongated guide means comprises at least one straight guide member for said one mold section.

5. A combination as defined in claim 3, wherein said guide means comprises at least two parallel tie rods.

6. A combination as defined in claim 5, wherein said guide means further comprises a first platen secured to said tie rods and supporting the other of said mold sections, said transporting means further comprising a second platen mounted on said tie rods for movement lengthwise of said guide means and supporting said one mold section.

7. A combination as defined in claim 3, wherein the other of said mold sections is secured to said guide means and said transporting means further comprises a reversible drive operative to move said one mold section back and forth relative to said guide means and said other mold section.

8. A combination as defined in claim 7, further comprising second drive means for moving said guide means and said other mold section toward said predetermined plane in response to operation of said reversible drive means to move said one mold section toward said predetermined plane to thus move said mold sections from said open to said closed positions thereof.

9. A combination as defined in claim 8, wherein said reversible drive means is further operative to move said mold sections simultaneously to thereby transport the confined blank from said predetermined plane into said second plane, said second drive means being inoperative during such simultaneous movement of said mold sections.

10. A combination as defined in claim 8, wherein one of said drive means is arranged to move the respective mold section at a speed which differs from the speed of the other mold section during movement of said mold sections between said open and closed positions thereof.

11. A combination as defined in claim 10, wherein said one drive means is said second drive means.

12. A combination as defined in claim 8, wherein said second drive means comprises a first toothed rack parallel with said guide means and arranged to share the movements of said one mold section, a second toothed rack parallel with said first rack and arranged to share the movements of said other mold section, a first pinion meshing with one of said racks and a second pinion coaxial and rigid with said one pinion and meshing with the other of said racks.

13. A combination as defined in claim 12, wherein the diameter of one of said pinions exceeds the diameter of the other pinion.

14. A combination as defined in claim 13, wherein said pinions are disposed between said racks so that when said pinions rotate, said racks are caused to move in opposite directions.

15. A combination as defined in claim 14, wherein said transporting means further comprises a frame having second elongated guide means parallel with said first-mentioned guide means, and a housing reciprocable along said second guide means and reciprocably supporting said first-mentioned guide means, said pinions being rotatably mounted in said housing.

16. A combination as defined in claim 15, wherein said transporting means further comprises a pair of spaced arresting means for arresting said housing in two predetermined end positions with reference to said second guide means.

17. A combination as defined in claim 16, wherein said first drive means comprises a double-acting cylinder member and a piston member having an elongated piston rod and being reciprocably received in said cylinder member, one of said members being secured to said one mold section and the other of said members being secured to said frame.

18. A combination as defined in claim 17, further comprising a first platen secured to said first-mentioned guide means and supporting said other mold section, a second platen reciprocably supported by said first-mentioned guide means and supporting said one mold section, a third platen reciprocably supported by said first-mentioned guide means, and distancing means coupling said third platen to said second platen, said one member being secured to said one mold section by way of said second and third platens and said distancing means.

19. A combination as defined in claim 3, wherein said transporting means comprises fluid-operated first drive means for moving said one section with and relative to said other section and mechanical second drive means for moving said other section relative to said one section.

20. In an apparatus for the production of hollow plastic articles by the blow molding method, a combination comprising a plasticizing unit having extruder means for discharging blanks of plasticized synthetic plastic material in a predetermined plane; a blow mold having first and second mold sections; guide means defining an elongated path for movement of said mold sections substantially at right angles to said plane; and transporting means for first moving said mold sections towards each other along said path from an open position in which said sections are located at the opposite sides of and are spaced from said plane so that said extruder can discharge a blank into the space between said sections to a closed position in which said sections meet in said plane and confine the blank which was dicharged into said space, and for thereafter moving said closed mold sections together with each other in the same direction to thereby transport the confined blank along said elongated path into a second predetermined plane.

21. Apparatus as defined in claim 20, wherein one of said mold sections is located between said transporting means and the other of said mold sections, as considered in the direction of movement of said mold sections with and relative to each other.

* * * * *